United States Patent [19]

Webb

[11] Patent Number: 5,517,383

[45] Date of Patent: May 14, 1996

[54] BRANCHING UNIT FOR SUBMARINE SYSTEMS

[75] Inventor: Stephen M. Webb, Lee, United Kingdom

[73] Assignee: STC Submarine Systems Limited, Maidenhead, England

[21] Appl. No.: 206,002

[22] Filed: Mar. 3, 1994

[30] Foreign Application Priority Data

Mar. 3, 1993 [GB] United Kingdom .................. 9304328

[51] Int. Cl.[6] .............................. H01H 47/22; H04B 3/00
[52] U.S. Cl. ........................................ 361/191; 307/112
[58] Field of Search ................................ 333/100, 101, 333/105; 307/38, 125, 130, 131, 100, 112, 39, 41; 361/191, 170, 167, 166; 379/348, 296

[56] References Cited

U.S. PATENT DOCUMENTS

| | | | |
|---|---|---|---|
| 3,644,787 | 2/1972 | Hamilton | 307/100 X |
| 4,798,969 | 1/1989 | Inoue et al. | 307/112 |
| 5,196,984 | 3/1993 | Webb | 361/191 |
| 5,214,312 | 5/1993 | Inoue | 307/112 X |
| 5,334,879 | 8/1994 | Inoue et al. | 361/191 X |

Primary Examiner—Fritz M. Fleming
Attorney, Agent, or Firm—Lee, Mann, Smith, McWilliams, Sweeney & Ohlson

[57] ABSTRACT

A branching unit for use in submarine telecommunications optical cable systems which employs electrical power feeding for repeater/regenerators of the cable system, in particular a system employing multiple branching units. The unit terminates three line cables (at 1, 2, 3) and a sea earth (at 4) and includes first, second the third high voltage relays (A, A1, B, B1, C, C1), only one of which is energized at a time. When electrical power is supplied between any two line terminations, e.g. 1 and 3, an associated relay coil, e.g. C is energized so that its contacts C1 isolate the third line termination, e.g. 2, and connect it to the sea earth termination (4) via fourth, or fifth, relay contacts (D1, E1 ). The branching unit also includes a plurality of optical regenerators, for optical path switching purposes, which require electrical power feeding and whose power feed circuits 20 are connected in parallel with each of the relay coils. When any relay is energized, i.e. the cable system is powered up, the regenerators are also powered. The zener diodes (21) provide voltage supply to the regenerator power feed circuits as well as providing surge protection for them and the relay coils simultaneously. The fourth-and fifth relays (D, D1, E, E1) serve to prevent arc transfer in the first, second and third relays (FIG. 4).

8 Claims, 6 Drawing Sheets 5,517,383

BRANCHING UNIT FOR SUBMARINE SYSTEMS

This invention relates to branching units for power feeding submarine telecommunications systems, in particular optical fibre submarine cable systems.

BACKGROUND OF THE INVENTION

Submarine cable systems originally were such as to connect two land terminals which were, for example, on opposite sides of the Atlantic ocean. A later development involved having two land terminals on one side and a third on the other side, there being a main cable extending between the third land terminal and a branching unit (y interconnect) and spur cables extending from the branching unit to the other two terminals. Repeaters may be disposed in the main cable and the spur cables and power feed provision must thus be made. The repeaters can be powered by supplying current between a land terminal (terminal station) at one end of a branch (main or spur) cable and a distant earth (single end feeding) or between any two terminal stations (double end feeding). Branching units have previously been proposed whereby power feed of repeaters in the main cable and one spur cable is by double end feeding, whereas that of repeaters in the other spur cable is by single end feeding, the earth being provided by a sea earth cable integral to the branching unit. The branching unit may include relays by means of which the power feeding can be changed (switched) in the event of fault conditions in one of the branches, in order to isolate that branch whilst continuing to power the other branches.

Optical fibre submarine cable systems are now being designed which have a number of branching units, that is they involve multiple landing points. One form of branching unit for use in such a system is described by M W Perry, G A Reinold and P A Yeisley in IEEE Journal on Selected Areas in Communications—Vol SAC-2 No. 6 November 1984. It has been found that under certain conditions, flashover within the relays of this arrangement can result in discharge of a main cable to earth. The consequent current usage can result in permanent damage to the system. A further branching unit suitable for use in multiple branching unit systems is disclosed in our GB published Application No. 2252686A (S M Webb 1) This known branching unit is a passive unit, i.e. it does not involve regenerators for the optical signals, designed to terminate three line cables and also provide a sea earth for power feeding.

It is an object of the present invention to provide an alternative form of branching unit suitable for use in multiple branch unit systems and which includes regenerators.

SUMMARY OF THE INVENTION

According to the present invention there is provided a branching unit, for use in submarine telecommunications optical cable systems employing electrical power feeding, the unit including a respective termination for each of three line cables and a termination for a sea earth, a plurality of optical regenerators requiring electrical power feeding and including a plurality of power feed circuits connected in series with one another, first, second and third electrical relays only one of which is energisable at a time, and a fourth electrical relay, and which unit is such that when electrical power is supplied between any pair of line cable terminations the third line cable termination is isolated therefrom and coupled to the sea earth via the fourth relay which is powered by said electrical power, and the plurality of power feed circuits of the optical regenerators are disposed in series between said any pair of line cable terminations whereby to achieve power feeding of the optical regenerators.

BRIEF DESCRIPTION OF THE DRAWINGS

Embodiments of the invention will now be described with reference to the accompanying drawings, in which.

DESCRIPTION OF PREFERRED EMBODIMENT

Figure 1:
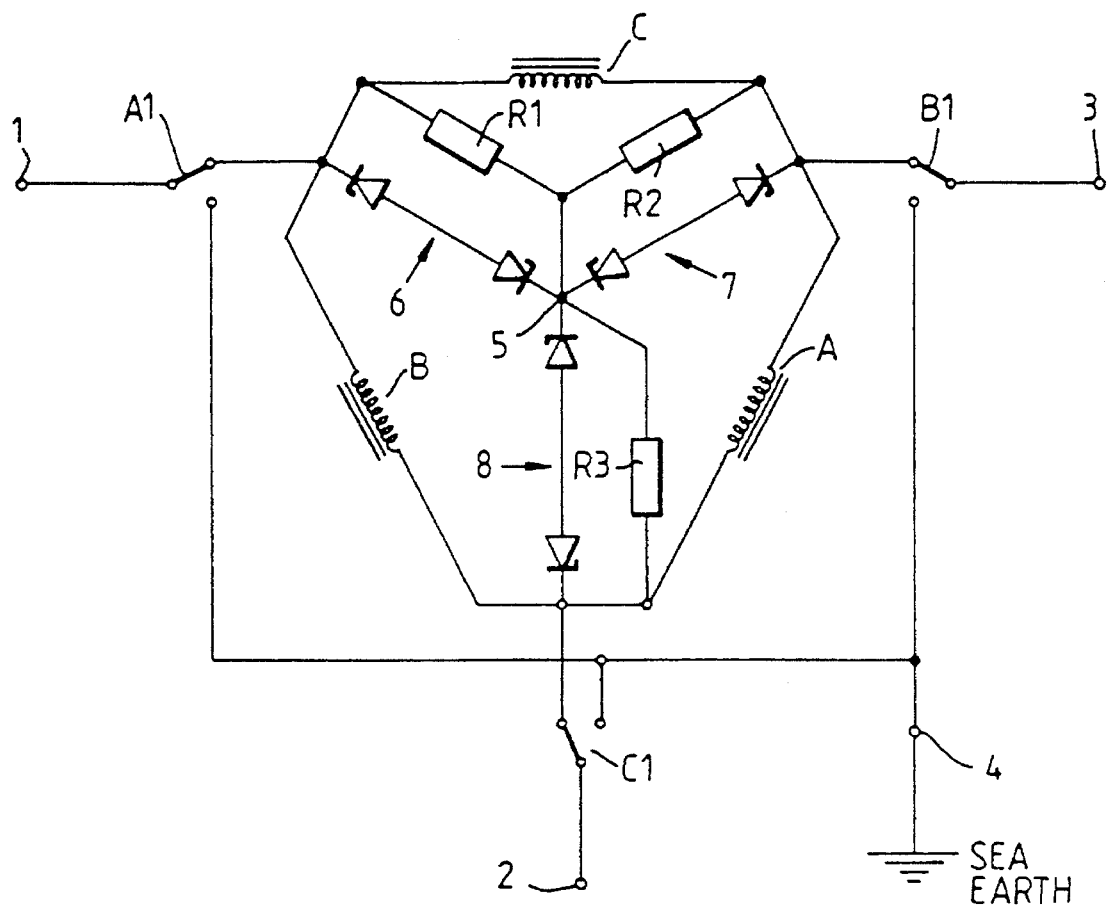
FIG. 1 illustrates the known branching unit referred to above.

The known branching unit of FIG. 1 has three terminals 1, 2 and 3 to which the power conductors of the respective branch cables are connected (terminated) in use, as well as a terminal 4 for connection to the sea earth. As will be appreciated from FIG. 1, the unit is symmetrical. It basically comprises three high voltage relays having relay coils A, B and C, respectively, which relay coils are arranged in a delta network, and relay contacts, A1, B1 and C1. Each relay coil is disposed between a pair of the line terminations (terminals) and the relay contacts corresponding to each coil are associated with the other one of the line terminations and the sea earth termination e.g. coil C is between terminations 1 and 3 while contacts C1 are adjacent termination 2 and connect to sea earth termination 4. With the relay contacts in the switch positions illustrated (the quiescent state) the arrangement is unpowered and the terminals 1, 2 and 3 are all connected to a junction point 5 and isolated from the sea earth. Series arrangements of Zener diodes 6, 7 and 8 are disposed between the junction point and the relay contacts A1, B1 and C1, as shown. In parallel with each series arrangement 6, 7 and 8 is a respective ballast resistor R1, R2 and R3. The overall arrangement provides for line current switching between the terminated cables. Once power has been applied to any two terminals, or rather the branches connected thereto, the remaining branch is isolated and switched to the sea earth. This remaining branch can be powered independently i.e. fed to the sea earth.

The three high voltage relays are used to switch the power paths. The two branch lines between which power is first applied cause the other branch line to be switched to the sea earth automatically. Only one of the relays is energised at a time.

The method of power feeding switching of the branching unit may involve first applying a low current of the order of say 500 mA between the branches over which power is intended to be applied, whilst open circuiting, at its remote end, the branch which is to be switched to the sea earth. Current then flows through the relay coil between the two powered branches, causing the relay contacts on the third branch to switch that branch to the sea earth. The voltage drop across the relay coil is held using the respective pair of zener diodes e.g. arrangements 6 and 7 for coil C. Relay coils A and B only see half of this voltage drop each and so are unable to switch. Once a relay has been switched, the current in each branch can be increased to the full line current, say 1.6 A, the majority of which flows through respective pairs of zener diodes.

If the branch cable connected to terminal 3 develops a short circuit or open circuit fault, the cable system may be depowered and then repowered with the contacts B1 switched to connect terminal 3 to the sea earth, thus also isolating the branch cable with the fault.

When used in a system employing a number of similar branching units, this known branching unit has the advantages over previous designs that open or short circuit faults in any branch may be isolated and powering of the fault free branches achieved without loss of the cathodic protection of the sea earth. Since the unit is symmetrical this protection is provided on all three lines terminated by the branching unit. Furthermore this known branching unit design is not polarity sensitive and therefore when used in conjunctions with repeaters suitable for reversible powering, great flexibility in the power feed arrangement is achieved.

As will be appreciated, as well as enabling the repeaters in the various branches to be powered, the branching units serve physically to link the telecommunications elements, i.e. the optical fibres, of the branch cables and they are required to do this in a way that allows various different configurations, as discussed above, so that in the event of faults in one branch, total communication is not lost, rather the system will be reconfigured as necessary to eliminate the faulty branch.

Figure 2:
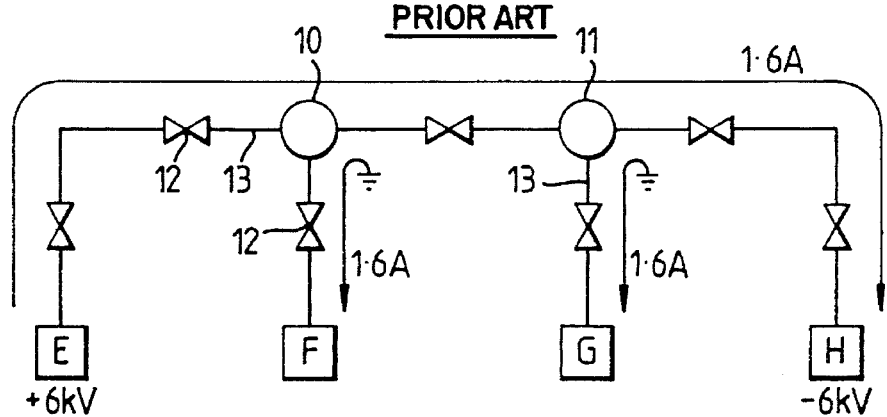
FIG. 2 illustrates a system with two branching units and four stations.

FIG. 2 illustrates schematically a system connecting four land stations E, F, G and H and including two branching units 10 and 11. Repeaters 12 are located in the various interconnecting cables 13. Whilst only one repeater is illustrated in the branches between 10 and F, 10 and 11 and 11 and G, in practice there may be more than one. To power up this system, initially a low current, but subsequently as described above 1.6 amps, is passed via the cable's power feed conductor between stations E and H, E being at say +6 kV and H at −6 kV. As a result of the known branching structure of FIG. 1 this results in, say, contacts C1 being changed over to connect station F to the sea earth and thus by applying a suitable voltage to the cable's power feed conductor at station F, 1.6 amps can be supplied to the repeaters 12 in that cable. The branching units are generally quite close to the shore and 1.5 kV may be sufficient to achieve 1.6 amps. The same process will apply to powering the repeaters in the cable from station G. If there is a break between station E and branching unit 10 as a result of the cable being cut, by an anchor for example, then the system can be powered between F and H, and with G connected to a sea earth as before. In the event that there is a shunt fault, e.g. the cable has been damaged by the anchor rather than broken and there is a contact between the seawater and the powerfeed conductor, the system can still be powered between E and H but the voltage at E would need to be decreased, say to +3 kV, and that at H increased to say −9 kV so that at the fault there is 0 volts. This is referred to as putting a virtual earth at the fault. The branches connected to F and G would be powered as before using the seawater earths. Another fault is where the cable has been stretched and gone open circuit although it has not broken or shorted out to the water. Powering would then be between F and H with G using a sea earth. The known branching unit illustrated in FIG. 1 allows any one of the branches to be earthed i.e. there are three possible configurations.

Figure 3:
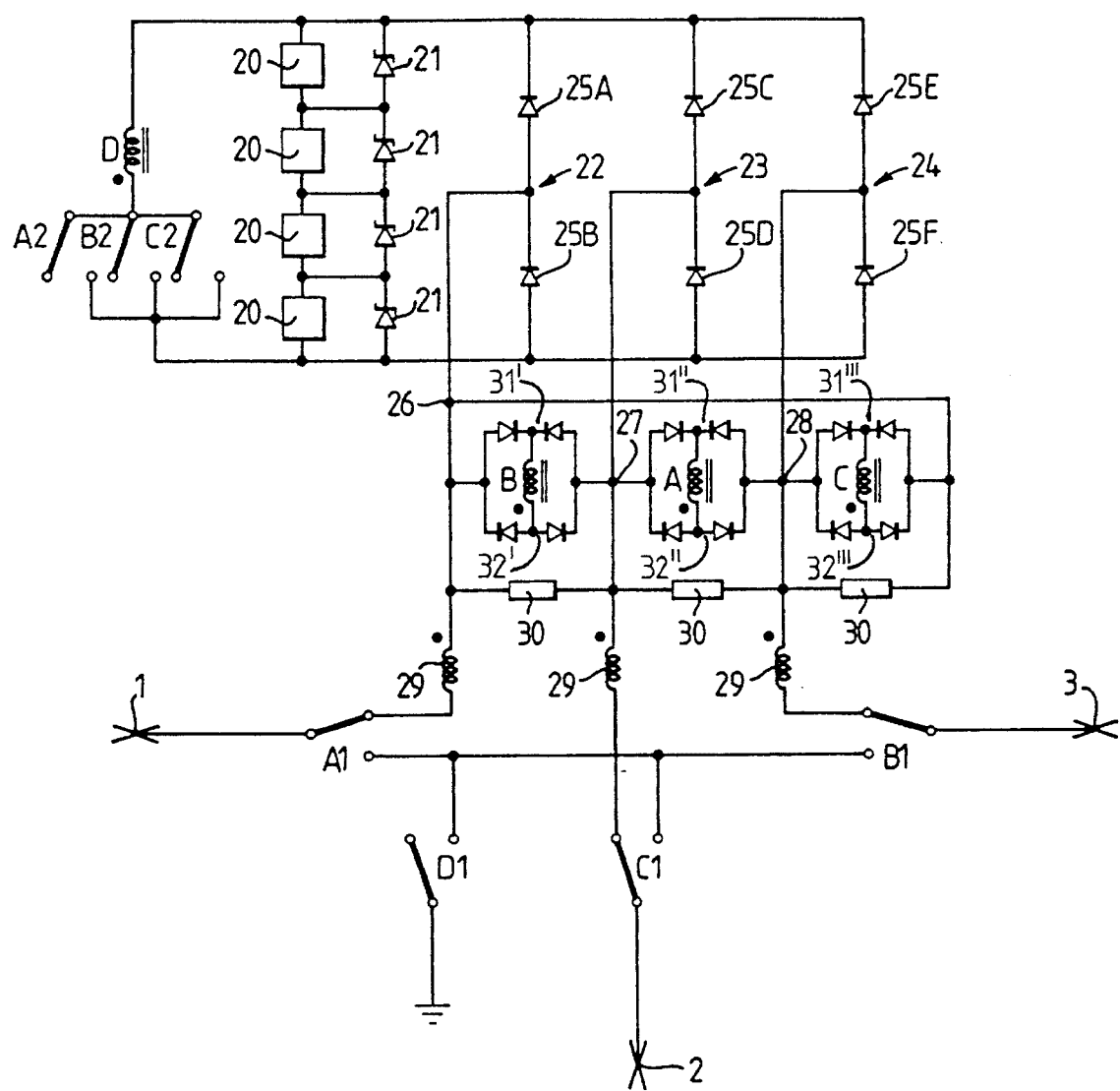
FIG. 3 illustrates an embodiment of branching unit according to the present invention and which is based on that of FIG. 1.

So far, optical failures have not been discussed. It is desirable, however, to be able to switch optical fibre paths in the event of an optical fibre path failure and for this purpose elements including optical regenerators can be included in the branching unit. The actual optical switching can be achieved simply by use of optical couplers and turning a laser off in one regenerator and on in another regenerator. The present invention is not concerned with the optical switching, rather it is concerned with how the regenerators in the branching unit can be powered for all three configurations of the branching unit and both possible current directions. Somehow the main 1.6 A into the branching unit must be made to actually power all of the regenerators. FIG. 3 illustrates schematically a reversible symmetric branching unit including regenerators that allows the required power feeding of the regenerators. The optical fibres and other optical elements are not illustrated since they are not concerned in the power feeding to which the present invention relates.

As in FIG. 1 the branching unit of FIG. 3 has three terminals 1, 2 and 3 to which the power conductors of the respective branch cables are connected (terminated) in use. There are three high voltage changeover vacuum relays having relay coils A, B and C, connected in the equivalent of a delta network, and relay contacts A1, B1 and C1. As will be appreciated from FIG. 3 there is also a relay, which is not a changeover relay, with a coil D and contacts D1 and the three first monitored relays also have relay contacts A2, B2 and C2. The significance of this will be appreciated from the following description. Each relay coil A, B, and C is disposed between a pair of the line terminations (terminals) and the relay contacts corresponding to each coil are associated with the other one of the line terminations and the sea earth e.g. coil C is between terminals 1 and 3 while contacts C1 are adjacent terminal 2 and can connect to the sea earth when contacts D1 are closed (changeover).

The arrangement of FIG. 3 includes three rectifier bridges 31', 31'', 31''', 32', 32'' and 32''', one around each of the relay coils A, B, C. These rectifier bridges ensure that no matter which direction current flows through the spurs (between the terminals) the coil energising current is always unipolar and helps to increase relay drop-out time via the flywheel effect. Under fault conditions, current flowing through the branching unit may suddenly reverse as the cable discharges into a short circuit. This reversed process may be quite slow for distant faults, thus there is time when an actuated relay is starved of current, furthermore, it must remagnetise with the opposite polarity. In short, the relay may unswitch and connect the spur cable to the main trunk cable causing a high current surge that may damage the relay, depending on the voltage at the time. As mentioned above, additionally the coil bridges act as "flywheels". Removal of current supply will cause a coil to generate a back voltage, the polarity of which is conducted by the bridge diodes. The diode conduction will further prolong the magnetic field decay and this the dropout time of the relay. This damping effect is sufficient to hold a relay in during the line current reversal and so prevent a grounded spur being connected to the main trunk. Due to the inclusion of the bridge diodes around the relay coils, A, B, C linearity bypass resistors 30 are included across each of them, since at low voltages these bridge diodes will not conduct. In FIG. 1 the relay coils and ballast resistors performed this function.

There are four regenerators in the illustrated arrangement, although this is not the only possibility, with their power feed circuits 20 connected in series. A respective zener diode 21 is connected across (in parallel with) each regenerator powerfeed circuit 20 and limits supply voltage to the regenerator, the four zener diodes 21 being connected in series. The arrangement of four zener diodes 21 is in effect disposed in parallel with each relay coil A, B and C.

Three pairs, 22, 23 and 24 of rectifier diodes 25A–25F, conducting in the same directions, are disposed in parallel with the series connections of regenerators and zener diodes. One pair of rectifier diodes is associated with each branch cable terminal. The junction 26 to which both coils B and C are connected is connected to a point between the rectifier diodes of pair 22, the junction 27 therebetween coils A and B is connected to a point between the rectifier diodes of pair 23, and the junction 28 to which both coils A and C are connected is connected to a point between the rectifier diodes of pair 24. As will be appreciated, associated with each coil A, B and C, is a respective pair of the pairs of rectifier diodes 22, 23 and 24. For example, coil C is associated with diode pairs 22 and 24, and the four diodes of these two pairs are arranged as a rectifier bridge. The line terminals 1 and 3 and the coil C are connected across one pair of the bridge's terminals and the regenerator powerfeed circuits 20 and zener diodes 21 are connected across the other pair of the bridge's terminals.

When a voltage is applied between two stations such that, for example, current flows between terminals 1 and 3, terminal 2 is connected to the sea earth as in the arrangement of FIG. 1 when contacts D1 are changed over. In addition current flows from junction 26 through rectifier diode 25A, the series connections of regenerator powerfeed circuits 20 and zener diodes 21, and rectifier diode 25F to junction 28 and thence to terminal 3.

Hence the regenerator powerfeed circuits are effectively put in series with the leg through which the current is being supplied and in which terminals (1 and 3 in this example) are connected and hence current is always supplied to the regenerators. If current flow is between terminals 1 and 2 and terminal 3 is connected to the sea earth when contacts D1 are changed over, current flows through rectifier diode 25A, the regenerator power feed circuits 20 and zener diodes 21 and rectifier diode 25D to junction 27 and thence to terminal 2. If terminals 2 and 3 are connected and terminal 1 is connected to the sea earth when contacts D1 are changed over and current flow is from terminal 2 to terminal 3, it also flows from junction 27 through rectifier diode 25C, the regenerator power feed circuits 20 and zener diodes 21 and rectifier diode 25F to junction 28. If the current flow is reversed e.g. with the last case but flow from terminal 3 to terminal 2, current flows from junction 28, through rectifier diode 25E, the regenerators 20 and the zener diodes 21, rectifier diode 25D to junction 27 and thence to terminal 2. The arrangement is symmetrical and reversible and achieves the requirement of supplying current to the regenerators irrespective of which two terminals (arms or branches of the system) are powered and irrespective of the current flow direction.

The relays are switched in the same sense as in the FIG. 1 arrangement. Considering current applied between terminals 1 and 3, relay coil C sees double the voltage of the coils A and B, which means that the C relay is capable of switching its contacts C1, but the A and B relays are not capable of switching their contacts A1 and B1 as they only have half of the voltage. The four zener diodes 21 simultaneously offer surge protection to the regenerator power feed circuits 20, relay coils A, B, C and the rectifier diodes, i.e. protection during current transients. These may occur such as when the cable is cut, it shorts out to the seawater and very large currents (300–400 amps) can flow. So by having the zener diodes in parallel with the regenerators they limit the voltage across the regenerators, as well as across the relay coils. So the system is totally internally surge protected. In addition, surge protection coils 29 are included between the terminals 1, 2 3 and the junctions 26, 27, 28 to lengthen the rise time in the event of a nearby shot circuit fault and to provide a smaller transient over a longer time than otherwise. The surge coils thus limit inductive voltage spikes between regenerators and across the rectifiers diodes and relay coils during current transients.

For cable fault finding purposes at low line currents it is required to have a dc path with defined resistance. The resistors 30 provide such a path since at low power feed voltages the rectifier bridge will not conduct significantly.

Illustrated in FIG. 3 between the sea earth and the contacts A1, B1 and C1 is the further relay contact D1 referred to above, associated with further relay coil D.

As is apparent from FIG. 3, the relays A, B and C actually have two sets of contacts, a first set corresponding to those of FIG. 1 and a second set labelled A2, B2 and C2 respectively which are normally open as shown. When either A2, B2 and C2 are changed over to the closed position the relay coil D is connected in parallel with the regenerators and contacts D1 can changeover. The D relay coil is thus operated as a slave relay to one of the A, B or C relays. Assuming that current is applied between terminals 1 and 3, the relay coil C is energised and both the C1 and C2 contacts switch.

The C2 contact changeover allows the energisation of the D relay coil and subsequent switching of the D1 contact, completing the sea earth connection to C1 and terminal 2. In this way it is arranged that no arcing occurs on the C1 contact but on the D1 contact instead. The arcing is due to the discharge of a partially charged spur cable into the sea earth. Arcing inside the C relay is not desired because it is a vacuum changeover relay with three connections and a destructive effect called "Arc Transfer" (described in greater detail hereinafter) takes place. Allowing an arc inside the D relay does not result in "Arc Transfer" since the D relay is not a changeover switch and it thus has only two connections. Any arc is small and within the specification of such a D relay. During power-up of the system, a spur will acquire charge and the subsequent grounding via relay actuation allows the spur rapidly to discharge. A small arc will be generated as the contacts bounce on make, thus liberating an amount of contact material into the vacuum. The metal ions can act as charge carriers and have a large mean free path within the vacuum. Should the ions pass between the opposite just opened contacts, they are accelerated by the high electric field and may gain considerable energy. Given a high enough accelerating voltage and a large enough concentration of ions, an avalanche effect may take place whereby all the main cable discharges across the contact gap even through the relay is supposedly isolating it from earth. Such a discharge is unchecked and limited only by the cable impedance, giving at least 100 A for typical cable switching voltages. A vacuum discharge has a constant voltage drop of the order of 20V, inferring a contact dissipation of some 2 kW, evolving much metal vapour which is deposited on the relay envelope and lowers the effective relay insulation resistance. After a number of such discharges relay failure will ensue. Use of the D relay however obviates this occurring with the A, B and C relays.

Figure 4:
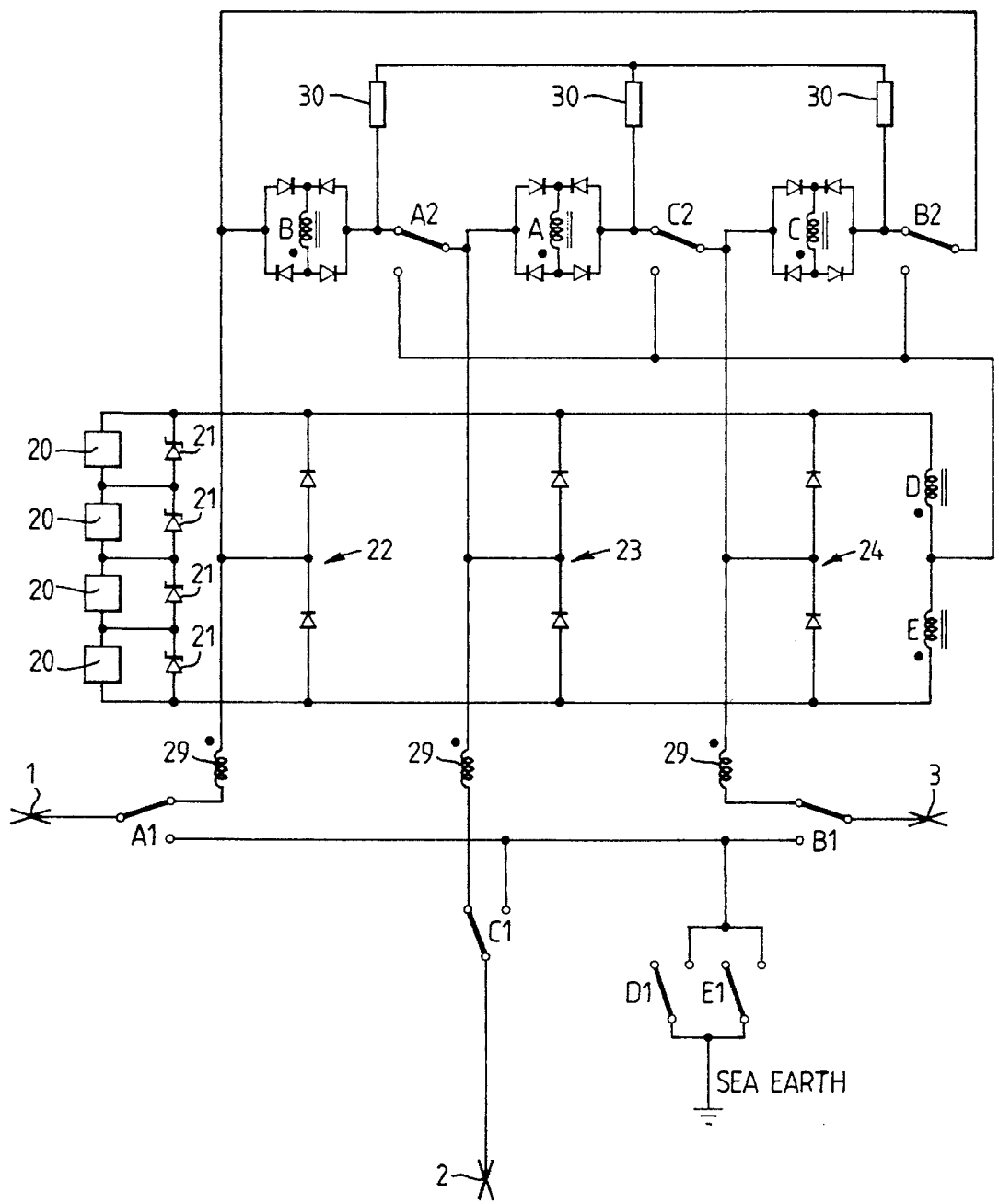
FIG. 4 illustrates another embodiment of branching unit according to the present invention.

The branching unit illustrated in FIG. 4 is a modification of that of FIG. 3. An additional relay (coil E and contacts E1) is included. This improves a common mode failure point in the earth path but is basically required in order to retain the symmetrical and bipolar features of the basic design. Which relay, D or E, is operated depends on the direction of current flow. D operates if the current flow from terminal 1 to terminal 3. E operates if the current flows from terminal 3 to terminal 1. The secondary contacts A2, B2, C2 have an additional function in this modified design as will be apparent from the following in which the operation of the modified circuit is described and reference made to the simplified diagrams of FIGS. 5a, 5b and 5c which shows respectively, the three successive stages involved for the relay switching sequence when powering from terminal 1 to terminal 3.

Figure 5A:
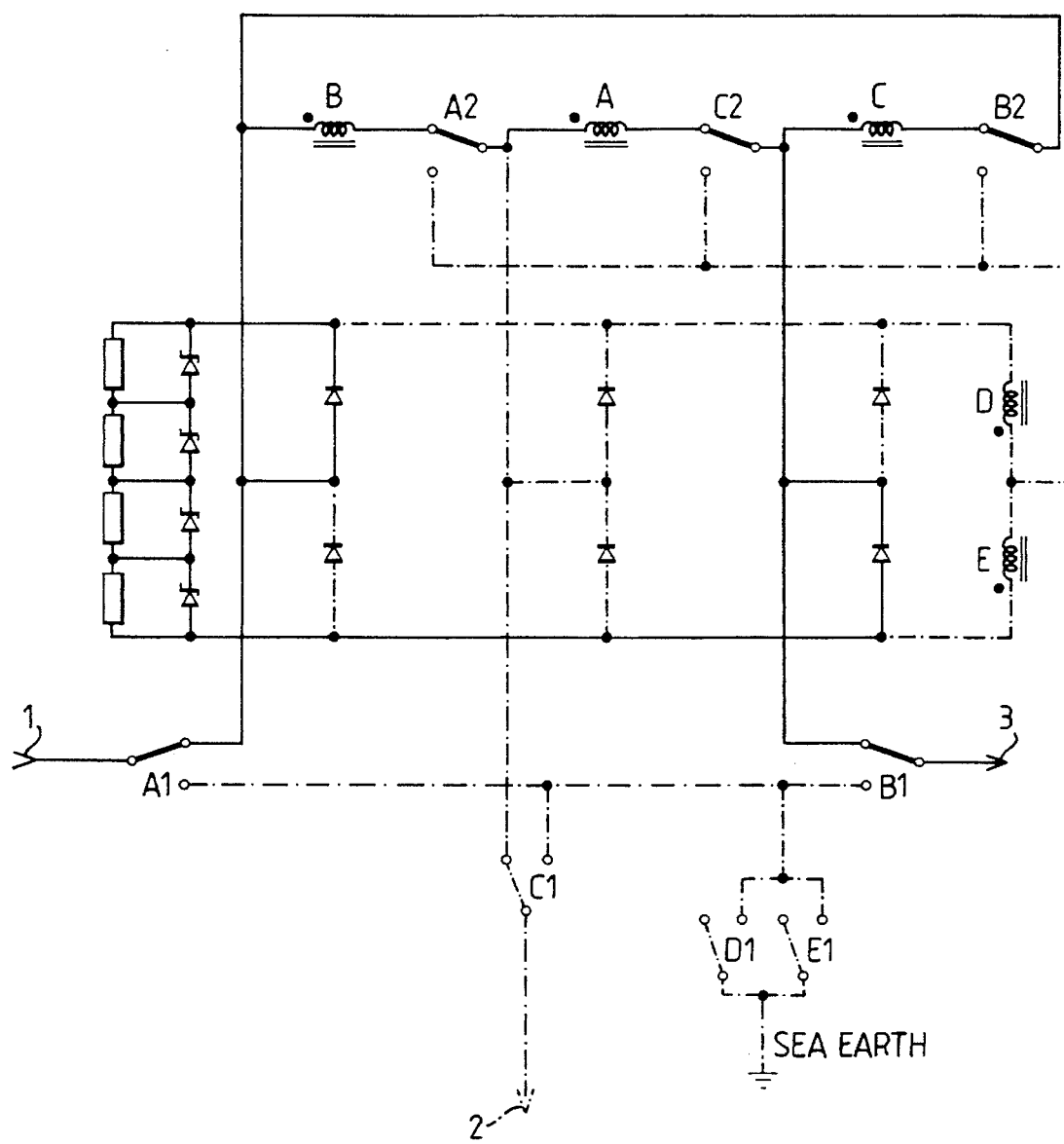
FIG. 5a, 5b and 5c illustrate three stages in powering up, namely energisation of the C relay, energisation of the D relay after the C relay has switched, and spur power-up after the D relay has switched.
Figure 5B:
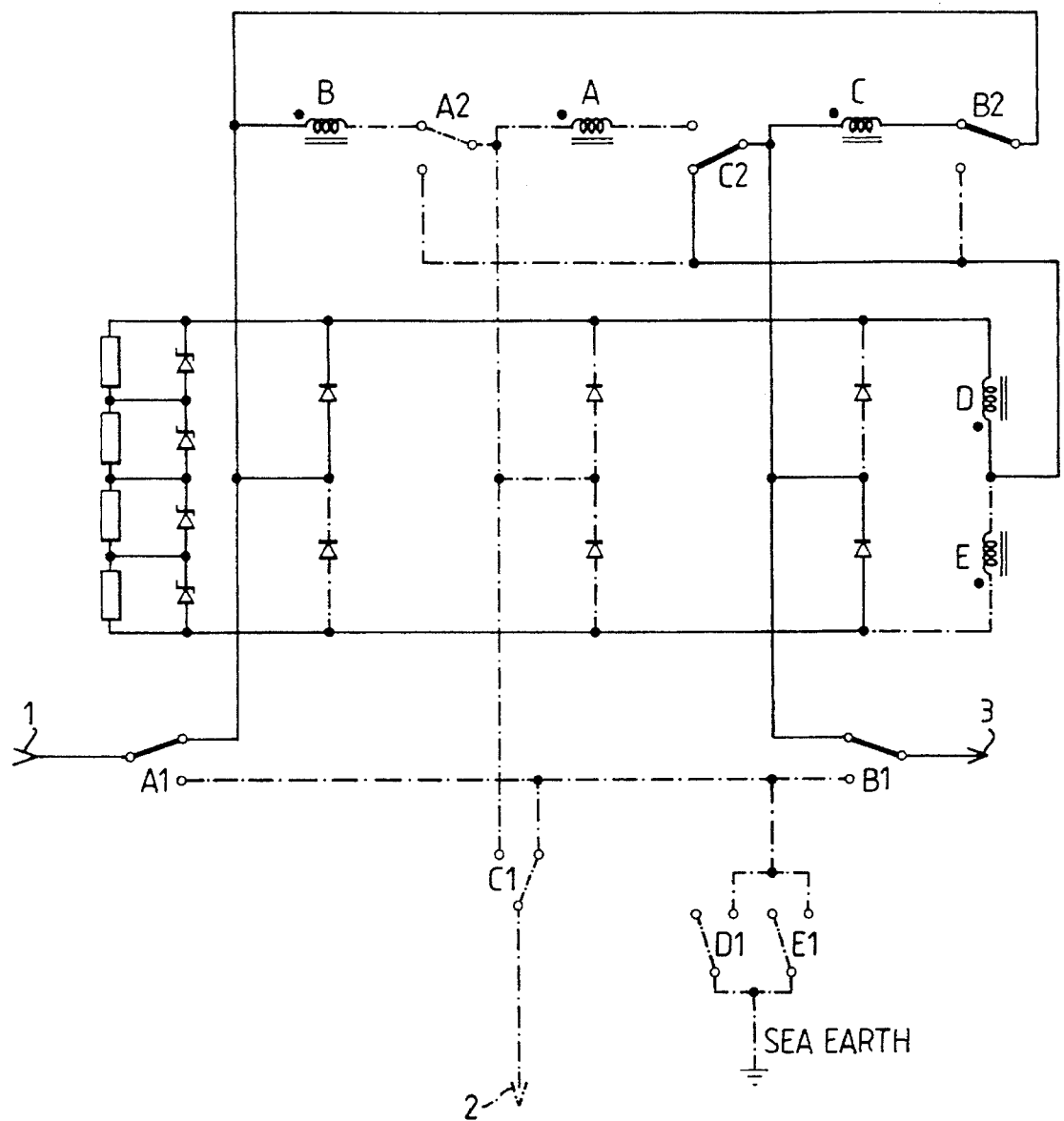
Figure 5C:
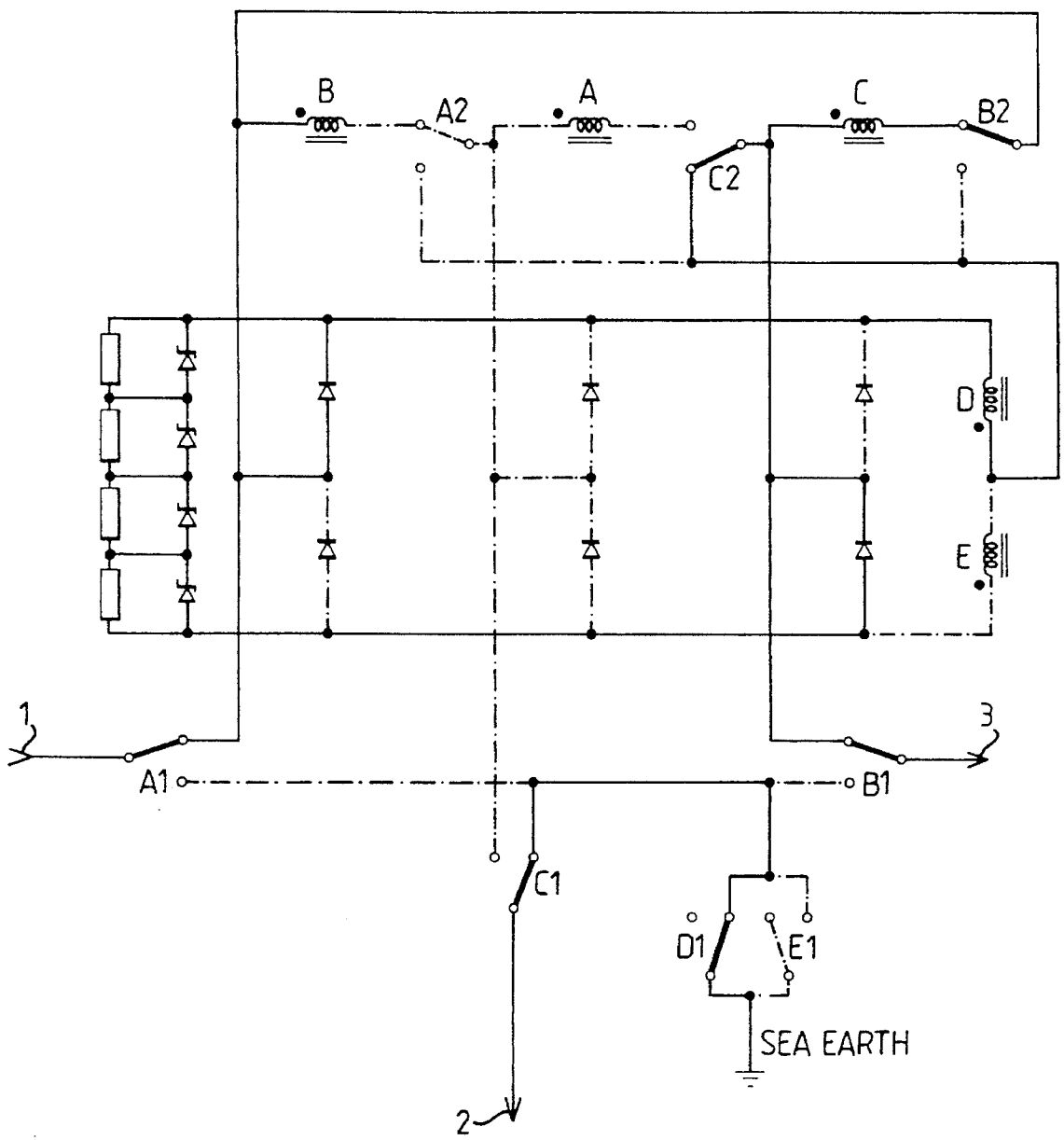

As before, the full current flows through coil C allowing contacts C1 and C2 to changeover. Contacts A1, A2, B1 and B2 do not change over since coils A and B see only half the current. Contacts C2 as well as activating relay D, D1 upon changeover and thus permitting connection of terminal 2 to the sea earth, in this case also disables the unswitched relays (with coils A and B) once the system is powered with the full line current. FIG. 5a illustrates energisation of the C relay during power up; FIG. 5b illustrates energisation of the D relay after the C relay has switched; and FIG. 5C illustrates the power-up of the spur connected to terminal 2 after the D relay has switched. In the design of FIG. 3 the relays A and B were left in circuit with a standing voltage of their coils. Whilst this voltage can be arranged to be below their pull-in voltage via the use of appropriate series resistors, such biasing can be upset by component ageing such as zener failure and from a reliability point of view switching the coils A and B out of circuit is considered preferable. If the current flow is in the direction from terminal 3 to terminal 1 relay is operated rather than relay D.

As will be appreciated, with the design of FIG. 3 all three switching configurations relied on the D relay to operate and pass spur line current. Failure of the D relay would preclude use of the spur. However, with FIG. 4 design and the second relay available in the Sea Earth path, a failure of relay D could simply be overcome by reversing the polarity of the main leg to utilise relay E instead, i.e. power from terminal 3 to terminal 1.

As will be appreciated, both the unused relays and the bypass resistors 30 are switched out of circuit after relay actuation. This results in a saving of line current. The resistors 30 are only required for low line current fault detection.

In summary, the invention thus provides a regenerated branching unit which allows an electrical circuit to be set up between any two branch cables whilst providing a sea earth for the third branch cable, and the regenerators in the branching unit are powered for all three switching conditions of the branching unit, and current directions. The zener diodes disposed in parallel with the regenerator power feed circuits simultaneously offer surge protection to the regenerators and the relay coils of the branching unit. A fourth relay circuit in series with the sea earth protects the other three relay contacts from the phenomenon of Arc Transfer during power up.

I claim:

1. A branching unit for use in submarine telecommunications optical cable systems employing electrical power feeding, the unit having a respective termination for each of three line cables and a termination for a sea earth, a plurality of optical regenerators requiring electrical power feeding and including a plurality of power feed circuits connected in series with one another, first, second and third electrical relays connected to said power feed circuits and only one of said relays being energisable at a time, and a fourth electrical relay connected to said first, second and third electrical relays, and said electrical relays being connected such that when electrical power is supplied between any pair of line cable terminations the third line cable termination is coupled to the sea earth via the fourth relay which is powered by said electrical power to thereby isolate the third line cable termination from said pair of line cable terminations, and the plurality of power feed circuits of the optical regenerators are disposed in series between said pair of line cable terminations to achieve power feeding of the optical regenerators.

2. A branching unit as claimed in claim 1 wherein the first, second and third relays have relay coils, said coils being arranged in a delta network with each coil being connectable between a respective pair of the line cable terminations via rectifier diodes, and wherein relay contacts corresponding to each coil of a said pair of line cable terminations are associated with the third line cable termination and the sea earth termination, such that power application between a said pair of line cable terminations causes switching of relay contacts of the coils of the relays of said pair of line cable terminations and said fourth relay such that the third line cable termination is connected to the sea earth termination.

3. A branching unit as claimed in claim 2 and including a zener diode arrangement comprising a plurality of zener diodes connected in series, each relay coil being disposed in parallel with the zener diode arrangement, and each zener diode of the arrangement being disposed in parallel with a respective one of said optical regenerator power feed circuits.

4. A branching unit as claimed in claim 3 and including three pairs of series connected rectifier diodes, each pair being associated with a respective line cable termination, disposed in parallel with the series connected zener diodes and the series connected optical regenerator power feed circuits, wherein each line cable termination is connectable to a point between the two rectifier diodes of the respective pair, each coil being connected across a respective pair of said points, the four rectifier diodes associated with a said coil being arranged as a rectifier bridge, and wherein the zener diodes provide surge protection for the regenerators, the relay coils and the rectifier diodes simultaneously.

5. A branching unit as claimed in claim 4, wherein between each line cable termination and the respective point is disposed a respective surge protection coil.

6. A branching unit as claimed in claim 5, wherein the relay coils of the first, second and third relays each have associated therewith a respective rectifier bridge whereby to prevent the line current reversals unlatching an actuated relay and causing surges at the relay contacts.

7. A branching unit as claimed in claim 1, wherein the fourth relay has a relay coil arranged in series with a parallel connection of first contacts of the first, second and third relays and which relay coil and first contacts are arranged in parallel with the plurality of power feed circuits, and wherein second contacts of the first, second and third relays are associated each with a respective one of the line terminations and relay contacts of the fourth relay are associated with the sea earth.

8. A branching unit for use in submarine telecommunications optical cable systems employing electrical power feeding, the unit having a respective termination for each of three line cables and a termination for a sea earth, a plurality of optical regenerators requiring electrical power feeding and including a plurality of power feed circuits connected in series with one another, first, second and third electrical relays connected to said power feed circuits and only one of said relays being energisable at a time, and fourth and fifth electrical relays connected to said first, second and third electrical relays, the fourth and fifth relays having relay coils arranged in series and the series arranged relay coils being arranged in parallel with the plurality of power feed circuits, and including means for operating the fourth relay if current flow is in one direction between a pair of said terminations and for operating the fifth relay if current flow is in an opposite direction to said one direction between said pair of terminations, and including means such that when electrical power is supplied between any pair of line cable terminations the third line cable termination coupled to the sea earth via the fourth relay which is powered by said electrical power to thereby isolate the third line cable termination from said pair of line cable terminations, and the plurality of power feed circuits of the optical regenerators are disposed in series between said pair of line cable terminations to achieve power feeding of the optical regenerators.

* * * * *